(12) United States Patent (10) Patent No.: US 9,509,029 B2
Hwang et al. (45) Date of Patent: Nov. 29, 2016

(54) MEDIATOR-TYPE PHOTOCELL SYSTEM

(71) Applicant: National Taiwan University of Science and Technology, Taipei (TW)

(72) Inventors: Bing-Joe Hwang, Taipei (TW); Wei-Nien Su, Taipei (TW); Chun-Jern Pan, Taipei (TW); Hung Ming Chen, Taipei (TW); Chia Feng Lee, Taipei (TW); Delele Worku, Taipei (TW); Wen-Ching Huang, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 171 days.

(21) Appl. No.: 14/053,748

(22) Filed: Oct. 15, 2013

(65) Prior Publication Data

US 2014/0170461 A1 Jun. 19, 2014

(30) Foreign Application Priority Data

Dec. 14, 2012 (TW) .............................. 101147630 A

(51) Int. Cl.
*H01M 14/00* (2006.01)
*H01G 9/20* (2006.01)

(52) U.S. Cl.
CPC ......... *H01M 14/005* (2013.01); *H01G 9/2072* (2013.01)

(58) Field of Classification Search
CPC .......................... H01M 14/005; H01G 9/2072
See application file for complete search history.

(56) References Cited

U.S. PATENT DOCUMENTS

| 2008/0286643 | A1* | 11/2008 | Iwasaki | B01D 53/326 |
| | | | | 429/111 |
| 2010/0133111 | A1* | 6/2010 | Nocera | C25B 1/003 |
| | | | | 205/633 |
| 2012/0080310 | A1* | 4/2012 | Nomura | C01B 3/042 |
| | | | | 204/263 |
| 2012/0156578 | A1* | 6/2012 | Taniguchi | C25B 1/003 |
| | | | | 429/422 |

FOREIGN PATENT DOCUMENTS

TW 200534330 A 10/2005

OTHER PUBLICATIONS

Office action issued May 19, 2014 from Taiwanese patent office in a counterpart Taiwanese patent application No. 101147630.
Office action issued on Jul. 22, 2015 from the PRC Patent Office in a counterpart PRC Patent Application.
M Sharon et al., Solar Rechargeable Battery—Principle and Materials, Electrochimica Acta, vol. 36, No. 7, pp. 1107-1126, 1991.

* cited by examiner

*Primary Examiner* — Muhammad Siddiquee
(74) *Attorney, Agent, or Firm* — The PL Law Group, PLLC

(57) ABSTRACT

A mediator-type photocell system is provided. The mediator-type photocell system includes a galvanic cell having a galvanic cell anode and a galvanic cell cathode; and a light capturing portion, including a light capturing cathode corresponding to the galvanic cell anode; and a light capturing anode electrically connected to the light capturing cathode via a conductive element, and corresponding to the galvanic cell cathode, wherein the galvanic cell cathode and the light capturing anode have a first mediator therebetween, the galvanic cell anode and the light capturing cathode have a second mediator therebetween, an oxide is generated to be provided to the galvanic cell cathode when the first mediator is illuminated, and a reducing substance is generated to be provided to the galvanic cell anode when the second mediator is illuminated.

20 Claims, 4 Drawing Sheets

MEDIATOR-TYPE PHOTOCELL SYSTEM

CROSS-REFERENCE TO RELATED APPLICATION AND CLAIM OF PRIORITY

The application claims the benefit of Taiwan Patent Application No. 101147630, filed on Dec. 14, 2012, in the Taiwan Intellectual Property Office, the disclosures of which are incorporated herein in their entirety by reference.

FIELD OF THE INVENTION

The present invention relates to a galvanic cell, and more particularly to a galvanic cell using the photocatalyst to generate the reductant and oxidizer.

BACKGROUND OF THE INVENTION

Please refer to FIG. 1, which shows a conventional galvanic cell 1a. The galvanic cell 1a includes a first trough T1 and a second trough T2, wherein the first trough T1 is separated from the second trough T2. The first trough T1 contains a first salt solution AQ1 for soaking a first metal M1, and the second trough T2 contains a second salt solution AQ2 for soaking a second metal M2. The first metal M1 and the second metal M2 are electrically connected to a load 2, and the first trough T1 is connected to the second trough T2 via a salt bridge SB. If the first metal M1 serves as the anode, i.e. the oxidizing terminal, it loses the electron $e^-$. The electron $e^-$ reaches the second metal M2 via the load 2. The first metal M1 is stored in the first salt solution AQ1 in the type of the cation. Because the second metal M2 obtains the electron, the metal cation in the second salt solution AQ2 is separated out and adhered to the second metal M2. The anion is generated in the second trough T2, and interacts with the cation of the first metal M1 via the salt bridge SB.

Please refer to FIG. 2, which shows another conventional galvanic cell 1b. The galvanic cell 1b includes a third trough T3 and a fourth trough T4, wherein the third trough T3 is separated from the fourth trough T4 by an ion penetrating element 13. The third trough T3 contains a third salt solution AQ3 for soaking a third metal M3, and the fourth trough T4 contains a fourth salt solution AQ4 for soaking a fourth metal M4. If the third metal M3 serves as the anode, i.e. the oxidizing terminal, it loses the electron $e^-$. The electron $e^-$ reaches the fourth metal M4 via the load 2. The third metal M3 is stored in the third salt solution AQ3 in the type of the cation. Because the fourth metal M4 obtains the electron, the metal cation in the fourth salt solution AQ4 is separated out and adhered to the fourth metal M4. The anion is generated in the fourth trough T4, and passes through the ion penetrating element 13 to reach the third trough T3.

The conventional galvanic cells are described above. However, besides the above-mentioned galvanic cells, other galvanic cells can use other metals to serve as the electrodes, or use other salt solutions to serve as the electrolytes, or add an auxiliary agent to the electrolyte. If the electrolyte or the metal electrode is exhausted, or the voltage is insufficient, it means that the cell is unserviceable. At this time, the components of the cell need to be replaced, or the entire cell needs to be replaced, or a reverse charge needs to be performed to restore the cell to the previous undischarged state. In terms of replacing the components of the cell, a lot of inconveniences are generated. In terms of replacing the entire cell, the cost of dealing with the waste cell is generated. Therefore, besides the purchasing and replacing costs, using the galvanic cell also results in an extremely high environmental cost.

For solving the above-mentioned issues, the fuel cell is invented. Please refer to FIG. 3, which shows a conventional fuel cell 1C. The fuel cell 1C includes a cell trough 10. The cell trough 10 has a cathode 11 and an anode 12. The cathode 11 is separated from the anode 12 by an ion penetrating element 13 so that the cell trough 10 is divided into a cathode trough 10a and an anode trough 10b. The oxygen 11G is transported to the cathode trough 10a, and the hydrogen gas 12G is transported to the anode trough 10b. Through the functions of the electrolytic substance and the anode 12 in the cell trough 10, the hydrogen gas 12G is oxidized to release the electron, and then the electron reaches an external load 2. The hydrogen ion without the electron, i.e. the proton, passes through the ion penetrating element 13 to reach the cathode trough 10a. At this time, the electron also reaches the cathode 11, and the oxygen 11G is also transported to the cathode trough 10a so that the proton, the electron, and the oxygen 11G are combined to become the water W, with the cooperation of the cathode 11.

The conventional fuel cell is described above. However, the above-mentioned fuel (reductant) and oxidizer can be replaced by other fuels and oxidizers. By carefully selecting the fuel (reductant) and oxidizer of the fuel cell, the environmental damage resulting from the waste product generated by the fuel cell can be reduced. In FIG. 3, the fuel is the hydrogen gas, and the oxidizer is the oxygen. The fuel cell 1C of FIG. 3 is advantageous in that the waste product generated by the fuel cell 1C is only the water, which has a minimum impact on the environment. The conventional method for using the fuel and oxidizer is to use the heat engine to covert the energy generated by the combustion of the fuel and oxidizer via the mechanical structure so as to drive the generator to generate power. For example, the heat engine can be an internal combustion engine or an external combustion engine. For example, the internal combustion engine can be a gasoline and diesel engine or a gas turbine, and the external combustion engine can be a steam turbine. However, in the fuel cell, the flow of the electron reacted between the fuel and the oxidizer directly serves as the power source. Theoretically, the fuel cell has a maximum efficiency and a minimum overall volume. Besides, the fuel cell is convenient to use.

However, the fuel (reductant) or the oxidizer used in the fuel cell is not easy to be stored. For example, the hydrogen gas serving as the fuel and the oxygen serving as the oxidizer need to be stored in a high-pressure bottle to enhance the capacity, or they are easy to be exhausted. Besides, other types of fuels or oxidizers may be limited to other conditions due to their higher activities, or will discharge the greenhouse gas. Therefore, a new technology is needed in this field to break through these limitations so that the fuel cell can be widely used.

In order to overcome the drawbacks in the prior art, a mediator-type photocell system is provided. The particular design in the present invention not is only solves the problems described above, but also is easy to be implemented. Thus, the present invention has the utility for the industry.

SUMMARY

The object of the present invention is to enhance the elasticity of use for the galvanic cell and the fuel cell, reduce the difficulty of use resulting from the storage conditions of the reductant (fuel) and oxidizer or the types of waste products, and reduce the volume of the cell. The present invention combines the principle of the galvanic cell or the fuel cell with the generating principles of the photocatalyst oxide and the photocatalyst reducing substance. Hence, the waste product of the galvanic cell or the fuel cell due to the consumption of materials can be restored to the inoxidized or unreduced material because of the function of the photocatalyst. This reduces or even eliminates the space for storing the gas (oxide and reducing substance). That is to say, the substance generated by the photocatalyst is directly provided to the galvanic cell.

In accordance with an aspect of the present invention, a mediator-type photocell system is provided. The mediator-type photocell system includes a galvanic cell having a galvanic cell anode and a galvanic cell cathode; and a light capturing portion, including a light capturing cathode corresponding to the galvanic cell anode; and a light capturing anode electrically connected to the light capturing cathode via a conductive element, and corresponding to the galvanic cell cathode, wherein the galvanic cell cathode and the light capturing anode have a first mediator therebetween, the galvanic cell anode and the light capturing cathode have a second mediator therebetween, an oxide is generated to be provided to the galvanic cell cathode when the first mediator is illuminated, and a reducing substance is generated to be provided to the galvanic cell anode when the second mediator is illuminated.

In accordance with another aspect of the preset invention, a photocatalyst galvanic cell system using a water as a mediator is provided. The photocatalyst galvanic cell system includes a galvanic cell, including an anode oxidizing a hydrogen to generate an electron and a hydrogen ion; and a cathode receiving the electron to reduce an oxygen into the water; a photocatalyst hydroxide device, including a light capturing anode having an oxygen generating photocatalyst for absorbing a light to generate the oxygen; a light capturing cathode having a hydrogen generating photocatalyst for absorbing the light to generate the hydrogen; and a conductive element propagating the electron at the light capturing anode to the light capturing cathode.

In accordance with a further aspect of the present invention, a photocatalyst galvanic cell system is provided. The photocatalyst galvanic cell system includes a first trough including a first mediator, a first photo-electrode and a first galvanic electrode, wherein the first mediator absorbs a solar energy to generate a first mediator product to be provided to the first galvanic electrode; and a second trough including a second mediator, a second photo-electrode and a second galvanic electrode, wherein the second mediator absorbs the solar energy to generate a second mediator product to be provided to the second galvanic electrode, and the first photo-electrode is electrically connected to the second photo-electrode.

Generally, the mediator-type photocell system of the present invention includes a galvanic cell and a photocatalyst material generating portion. The galvanic cell anode is corresponding to the photocatalyst cathode and cooperates therewith. The galvanic cell cathode is corresponding to the photocatalyst anode and cooperates therewith. That is to say, the material generated at the photocatalyst cathode due to the reduction is oxidized at the galvanic cell anode to generate the electron, which is then transported to the galvanic cell cathode. The material generated at the photocatalyst anode due to the oxidization is reduced at the galvanic cell cathode due to the acquisition of the electron. In a word, the present invention provides materials to the galvanic cell to serve as the reductant and the oxidizer through the photocatalyst principle, and generates the electron to be provided to the external load. The oxidized reductant and the reduced oxidizer can be provided to the photocatalyst for the photocatalyst reaction. That is to say, "the oxidized reductant" is re-reduced by the photocatalyst, and "the reduced oxidizer" is re-oxidized by the photocatalyst.

In the present invention, the hydrogen gas serves as the fuel, and the oxygen serves as the oxidizer. The hydrogen is oxidized to the hydrogen cation at the galvanic cell anode, and the hydrogen cation is reduced to the hydrogen at the photocatalyst cathode. Similarly, the oxygen is reduced to the oxygen anion, which usually exists in the water molecule, at the galvanic cell cathode, and the oxygen anion is oxidized to the oxygen at the photocatalyst anode. The electron of the galvanic cell anode passes through the external load and then reaches the galvanic cell cathode. The electron of the photocatalyst anode reaches the photocatalyst cathode via a conductive element. In principle, the galvanic cell and the photocatalyst hydroxide generating device can be disposed in different spaces, wherein the galvanic cell cathode and the galvanic cell anode also can be disposed in different spaces. Furthermore, the photocatalyst reductant generating portion and the photocatalyst oxidizer generating portion also can be disposed in different spaces. Besides, each generating portion can be filled with the medium including the water or the organic solution.

The above objects and advantages of the present invention will become more readily apparent to those ordinarily skilled in the art after reviewing the following detailed descriptions and accompanying drawings, in which:

DETAILED DESCRIPTION

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
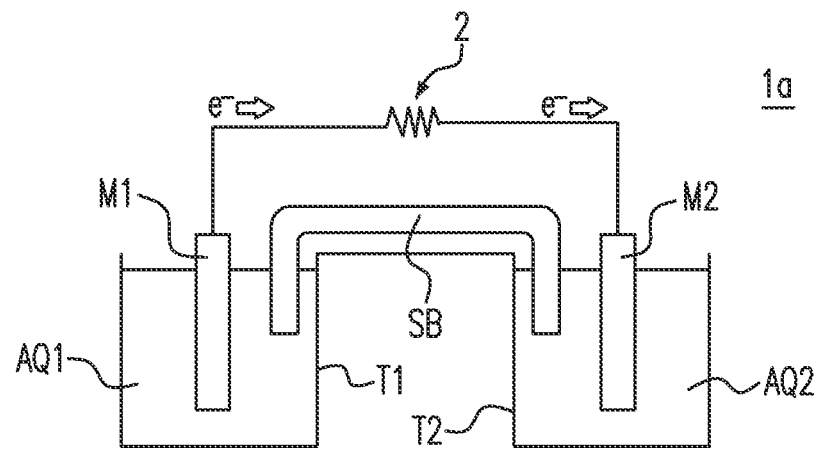
FIG. 1 shows a conventional galvanic cell.
Figure 2:
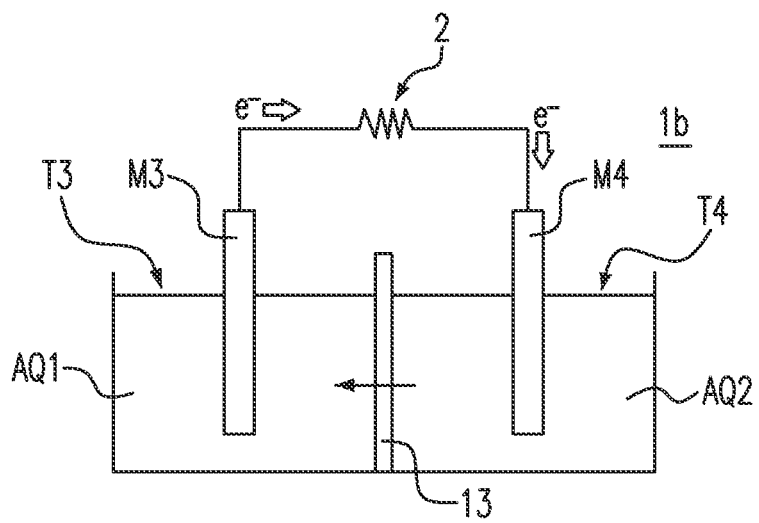
FIG. 2 shows another conventional galvanic cell.
Figure 3:
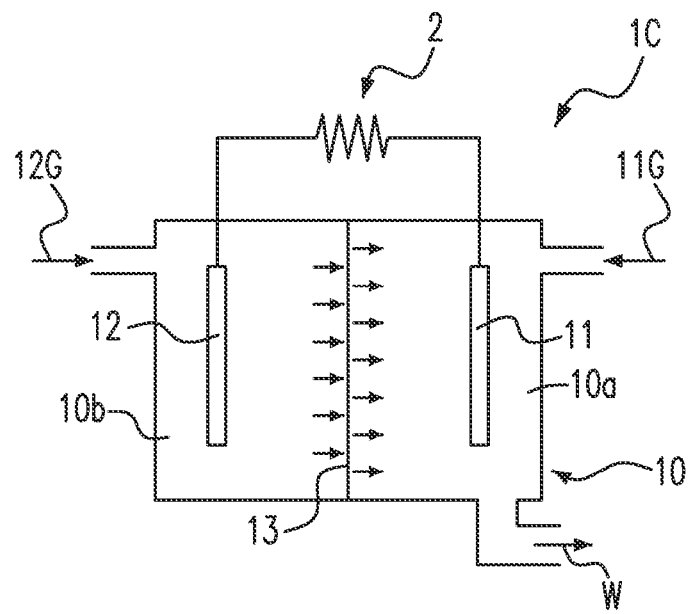
FIG. 3 shows a conventional fuel cell.
Figure 4:
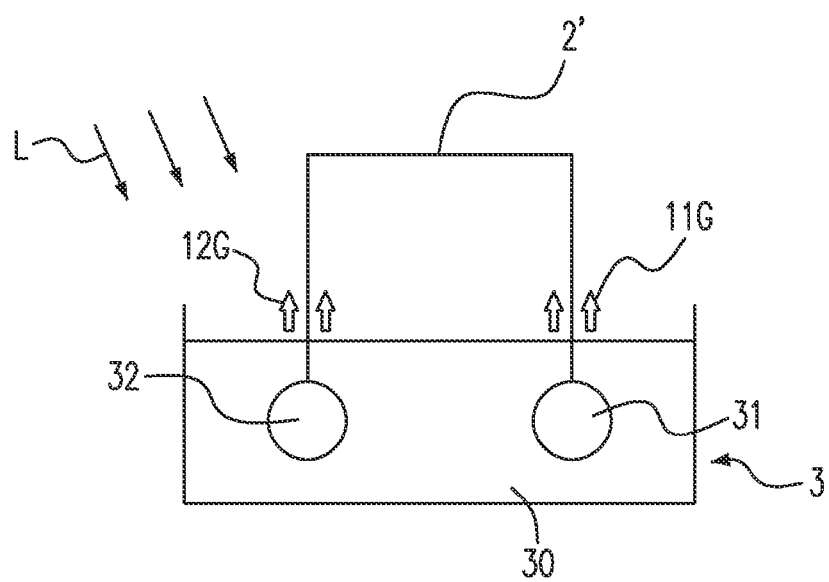
FIG. 4 shows the principle of the photocatalyst.

Please refer to FIG. 4, which shows the principle of the photocatalyst. FIG. 4 discloses a photocatalyst hydroxide device 3. The photocatalyst hydroxide device 3 includes a water tank 30. The water tank 30 includes an oxygen terminal 31 and a hydrogen terminal 32. The oxygen terminal 31 has an oxygen generating photocatalyst for absorbing the light to generate the oxygen 11G. The hydrogen terminal 32 has a hydrogen generating photocatalyst for absorbing the light to generate the hydrogen 12G Besides, the photocatalyst hydroxide device 3 further includes a conducting wire 2'. When the oxygen generating photocatalyst of the oxygen terminal 31 absorbs the solar energy to extract the oxygen 11 g from the water, the electron is released, which is then transported to the hydrogen terminal 32 via the conducting wire 2'. The hydrogen generating photocatalyst of the hydrogen terminal 32 receives the electron and absorbs the solar energy. This enables the hydrogen in the water to be combined with the electron therein to become the hydrogen 12G.

Figure 5:
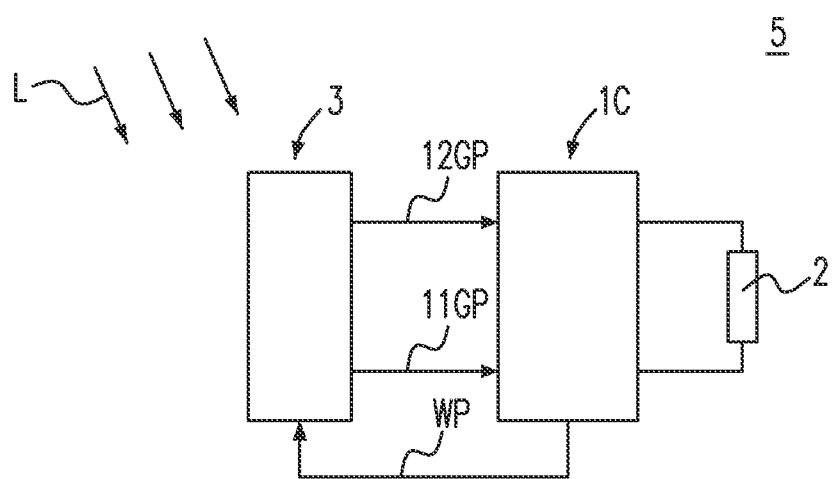
FIG. 5 shows a fuel cell system according to an embodiment of the present invention.

Please refer to FIG. 5, which shows a fuel cell system 5 according to an embodiment of the present invention. As shown in FIG. 5, a fuel cell 1c serves as the power source for supplying the power to a load 2. The fuel cell is electrically connected to a load 2. Besides, the photocatalyst hydroxide device 3 is connected to the fuel cell 1c via a oxygen conduit 11GP and a hydrogen conduit 12GP. The photocatalyst hydroxide device 3 is for transporting the hydrogen and the oxygen resulting from the light capturing portion being irradiated by the light L to the fuel cell 1c to serve as the reductant (fuel) and the oxidizer respectively. When the oxygen reacts with the hydrogen in the fuel cell 1c, the electron is released and the water is formed due to the combination of the oxygen with the hydrogen. The water flows back to the photocatalyst hydroxide device 3 via the water pipe WP to serve as the material for the photocatalyst reaction. Hence, the present invention can fully use the waste product generated by the reaction of the fuel cell 1c, which is helpful to keep the environment clean. Besides, for the convenience of use, the fuel cell 1c and the photocatalyst hydroxide device 3 can be combined to be a unit for facilitating the application in the vehicle and the vessel.

Figure 6:
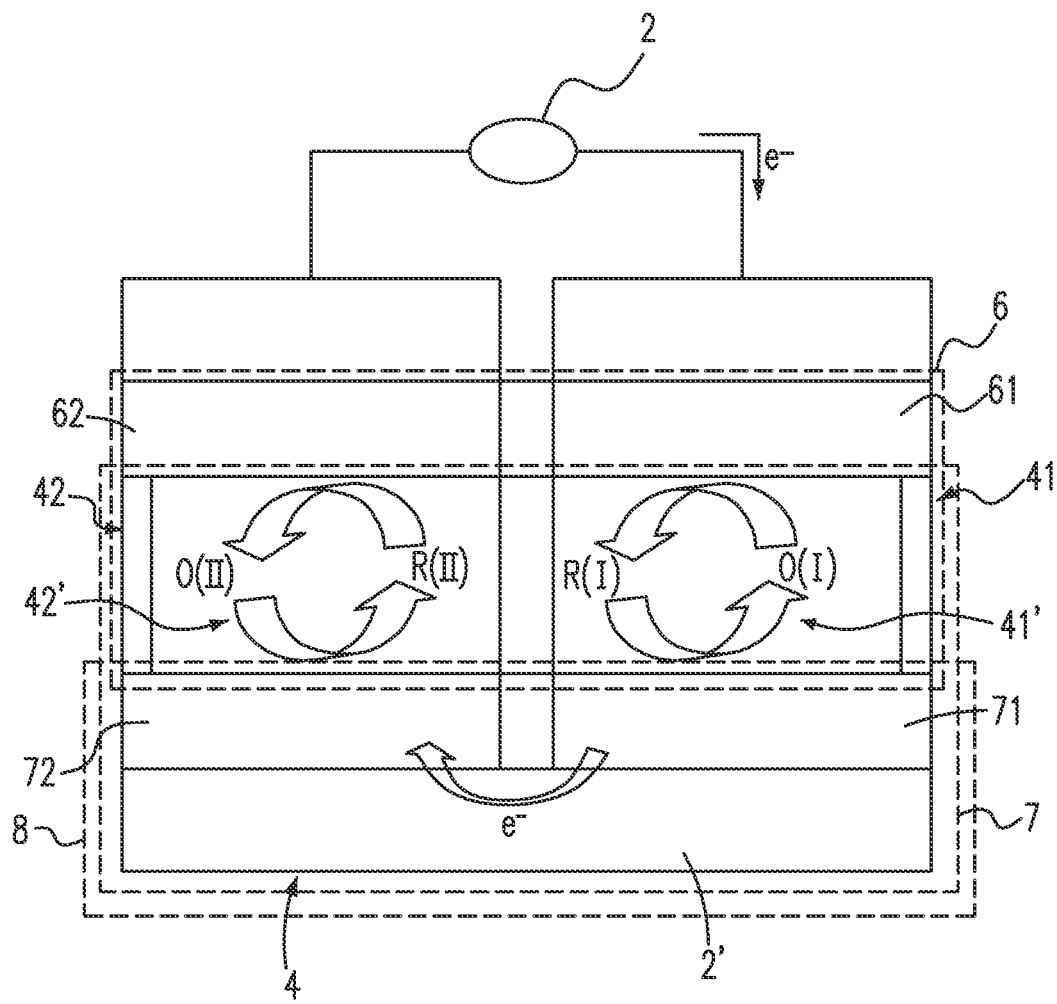
FIG. 6 shows a mediator-type photocell system according to an embodiment of the present invention.

Please refer to FIG. 6, which shows a mediator-type photocell system 4 according to an embodiment of the present invention. This embodiment discloses the application of the combination of the galvanic cell with the photocatalyst principle. The mediator-type photocell system 4 includes a first trough 41. The first trough 41 includes a first mediator 41', a first photo-electrode 71 and a first galvanic electrode 61. The first photo-electrode 71 is separated from the first galvanic electrode 61 by an insulator (not shown). The mediator-type photocell system 4 further includes a second trough 42. The second trough 42 includes a second mediator 42', a second photo-electrode 72 and a second galvanic electrode 62. The second photo-electrode 72 is separated from the second galvanic electrode 62 by an insulator (not shown). The first galvanic electrode 61, the second galvanic electrode 62, the first mediator 41' and the second mediator 42' constitute a galvanic cell 6.

The first mediator 41' absorbs the solar energy to generate a first mediator product to be provided to the first galvanic electrode 61. The second mediator 42' absorbs the solar energy to generate the second mediator product to be provided to the second galvanic electrode 62. The first photo-electrode 71 is electrically connected to the second photo-electrode 72 via a conductive element 2'. The first mediator 41', the second mediator 42', the first photo-electrode 71, the second photo-electrode and the conductive element 2' constitute a photocatalyst hydroxide device 7. The first photo-electrode 71, the second photo-electrode and the conductive element 2' constitute a light capturing portion 8.

The second mediator product is oxidized at the second galvanic electrode 62 so that an electron $e^-$ is generated. The electron $e^-$ is transported to an external load 2 and then reaches the first galvanic electrode 61. After the first galvanic electrode 61 obtains the electron $e^-$, the first mediator product is reduced. The second mediator product is oxidized at the second galvanic electrode 62 to become a second mediator sub-product. Then, the second mediator sub-product is reduced by the second photo-electrode to become the second mediator product. Similarly, the first mediator product is reduced at the first galvanic electrode 61 to become a first mediator sub-product. Then, the first mediator sub-product is oxidized by the first photo-electrode 71 to become the first mediator product.

Therefore, if the first photo-electrode 71 is an anode and the second photo-electrode 72 is a cathode, the first mediator product is an oxidizer and the second mediator product is a reductant. According to an embodiment of the present invention, the oxidizer can be the oxygen, and the reductant can be the hydrogen so that the mediator at least includes the water. Besides, the cocatalyst can be added to the mediator-type photocell system 4 of the present invention. Moreover, for the full reaction of the photocatalyst effect, the first photo-electrode and the second photo-electrode can be made by a transparent conductive substance.

As shown in the embodiment of FIG. 6, it features in that the first galvanic electrode, the first photo-electrode and the first mediator 41' in the first trough 41 are coexistent, and that the second galvanic electrode 62, the second photo-electrode 72 and the second mediator 42' in the second trough 42 are coexistent. That is to say, the first galvanic electrode 61, the first photo-electrode 71 and the first mediator 41' are simultaneously included in the first trough 41. Similarly, the second galvanic electrode 62, the second photo-electrode 72 and the second mediator 42' are simultaneously included in the second trough 42. This enables the products generated by the photocatalyst effect to be directly provided to the galvanic cell, without additional piping and channels to transport the products. Besides, the sub-products generated by the oxidation and reduction of the products are simultaneously existent in the first trough 41 and the second trough 42 for being used by the first photo-electrode 71 and the second photo-electrode 72. Therefore, the volume of the mediator-type photocell system 4 of the present invention can be effectively reduced.

Based on the above, the mediator-type photocell system of the present invention combines the photocatalyst device for generating the reductant and oxidizer with the galvanic cell. The present invention generates the electricity by absorbing the solar energy, which is different than the conventional solar cell dependent on the photovoltaic principle. The mediator-type photocell system of the present invention possesses the following characteristics. Firstly, since the present invention is performed according to the photosynthesis Z-scheme, a suitable photocathode photocatalyst and photocathode photocatalyst can be selected based on the energy of the absorbed light. This increases the flexibility in selecting the (semiconductor) material so that more energy of the solar spectrum zone can be absorbed. Secondly, unlike the conventional photovoltaic solar energy, the system of the present invention converts the solar energy into the chemical energy, and then converts the chemical energy into the electrical energy. Thirdly, the process of the present invention does not need to rely on energy-consuming vacuum conditions like that of the crystalline silicon solar cell material or that of the thin film solar energy material. Fourthly, the present invention does not need to use the proton exchange thin film or other ventilation films to avoid aging or performance degradation resulting from the mechanical or chemical stress. Fifthly, the conventional galvanic cell relies on the uninterrupted supply of gas and fuel to maintain operation. However, the system of the present invention is a built-in, complete and self-sufficient power system, without the need of additional supply pipelines or storage devices for gal and fuel. In particular, the present invention uses the product generated by the photocatalyst as the material of the galvanic cell. Take the hydrogen and oxygen for example. The reductant and oxidizer generated by the photocatalyst hydrolysis are provided to the galvanic cell, and the obtained hydrogen ion and water can be used for the subsequent photocatalyst hydrolysis reaction. This achieves a closed-loop power system, reduces the influence on the environment, and keeps the environment clean and immaculate. Accordingly, the present invention fully utilizes discharged substances of the galvanic cell, by using a suitable photocatalyst device to decompose the discharged substances into the reductant and oxidizer which are re-provided to the galvanic cell. This solves the drawbacks that the fuel and oxidizer of the galvanic cell are uneasy to supplement and that the supplement site therefor is sparse, thereby enhancing the life of the galvanic cell. Therefore, the present invention greatly contributes to the application of the galvanic cell, such as the mobile device or the portable electronic device. For example, the mobile device can be a vehicle or a ship, and the portable electronic device can be a computer or a cellphone.

Embodiments

1. A mediator-type photocell system, comprising:

a galvanic cell having a galvanic cell anode and a galvanic cell cathode; and a light capturing portion, including:

a light capturing cathode corresponding to the galvanic cell anode; and a light capturing anode electrically connected to the light capturing cathode via a conductive element, and corresponding to the galvanic cell cathode, wherein the galvanic cell cathode and the light capturing anode have a first mediator therebetween, the galvanic cell anode and the light capturing cathode have a second mediator therebetween, an oxide is generated to be provided to the galvanic cell cathode when the first mediator is illuminated, and a reducing substance is generated to be provided to the galvanic cell anode when the second mediator is illuminated.

2. The mediator-type photocell system of Embodiment 1, wherein the first mediator is included in a first medium.

3. The mediator-type photocell system of any one of Embodiments 1-2, wherein the first medium includes one of a water and an organic solution.

4. The mediator-type photocell system of any one of Embodiments 1-3, wherein the second mediator is included in a second medium.

5. The mediator-type photocell system of any one of Embodiments 1-4, wherein the second medium includes one of the water and the organic solution.

6. The mediator-type photocell system of any one of Embodiments 1-5, wherein the first medium is identical to the second medium.

7. The mediator-type photocell system of any one of Embodiments 1-6, wherein the conductive element is a transparent conductor.

8. The mediator-type photocell system of any one of Embodiments 1-7, wherein the galvanic cell has a power output port for driving a load.

9. The mediator-type photocell system of any one of Embodiments 1-8, wherein the first mediator and the second mediator include a pair of redox mediators.

10. The mediator-type photocell system of any one of Embodiments 1-9, wherein the first and the second mediators are illuminated by an external light.

11. A photocatalyst galvanic cell system using a water as a mediator, comprising:

a galvanic cell, including:
    an anode oxidizing a hydrogen to generate an electron and a hydrogen ion; and
    a cathode receiving the electron to reduce an oxygen into the water;

a photocatalyst hydroxide device, including:
    a light capturing anode having an oxygen generating photocatalyst for absorbing a light to generate the oxygen;
    a light capturing cathode having a hydrogen generating photocatalyst for absorbing the light to generate the hydrogen; and a conductive element propagating the electron at the light capturing anode to the light capturing cathode.

12. The photocatalyst galvanic cell system of Embodiment 11, wherein:

the anode and the light capturing cathode coexist in a first space;
    the cathode and the light capturing anode coexist in a second space; and
    the first space and the second space include the mediator.

13. The photocatalyst galvanic cell system of any one of Embodiments 11-12, wherein the photocatalyst hydroxide device absorbs a spectral wavelength from an ultraviolet light to an infrared light.

14. A photocatalyst galvanic cell system, comprising:

a first trough including a first mediator, a first photo-electrode and a first galvanic electrode, wherein the first mediator absorbs a solar energy to generate a first mediator product to be provided to the first galvanic electrode; and a second trough including a second mediator, a second photo-electrode and a second galvanic electrode, wherein the second mediator absorbs the solar energy to generate a second mediator product to be provided to the second galvanic electrode, and the first photo-electrode is electrically connected to the second photo-electrode.

15. The photocatalyst galvanic cell system of Embodiment 14, further comprising a cocatalyst.

16. The photocatalyst galvanic cell system of any one of Embodiments 14-15, wherein:
    the cocatalyst serves as one of a sacrificial reagent and a catalyst carrier.

17. The photocatalyst galvanic cell system of any one of Embodiments 14-16, wherein the cocatalyst is included in the first photo-electrode and the second photo-electrode.

18. The photocatalyst galvanic cell system of any one of Embodiments 14-17, wherein the cocatalyst is included in the first galvanic electrode and the second galvanic electrode.

19. The photocatalyst galvanic cell system of any one of Embodiments 14-18, wherein when the first photo-electrode is an anode and the second photo-electrode is a cathode, the first mediator product is an oxidizer and the second mediator product is a reductant.

20. The photocatalyst galvanic cell system of any one of Embodiments 14-19, wherein the oxidizer is an oxygen, and the reductant is a hydrogen.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mediator-type photocell system, comprising:
a galvanic cell having a galvanic cell anode and a galvanic cell cathode; and
a light capturing portion, comprising:
a light capturing cathode corresponding to the galvanic cell anode; and
a light capturing anode electrically connected to the light capturing cathode via a conductive element, and corresponding to the galvanic cell cathode, wherein the galvanic cell cathode and the light capturing anode have a first mediator and a first insulator therebetween, the first insulator separates the galvanic cell cathode from the light capturing anode, the galvanic cell anode and the light capturing cathode have a second mediator and a second insulator therebetween, the second insulator separates the galvanic cell anode from the light capturing cathode, an oxide is generated for providing to the galvanic cell cathode when the first mediator is illuminated, and a reducing substance is generated for providing to the galvanic cell anode when the second mediator is illuminated.

2. A mediator-type photocell system as claimed in claim 1, wherein the first mediator is included in a first medium.

3. A mediator-type photocell system as claimed in claim 2, wherein the first medium comprises one of a water and an organic solution.

4. A mediator-type photocell system as claimed in claim 3, wherein the second mediator is included in a second medium.

5. A mediator-type photocell system as claimed in claim 4, wherein the second medium comprises one of the water and the organic solution.

6. A mediator-type photocell system as claimed in claim 5, wherein the first medium is identical to the second medium.

7. A mediator-type photocell system as claimed in claim 1, wherein the conductive element is a transparent conductor.

8. A mediator-type photocell system as claimed in claim 1, wherein the galvanic cell has a power output port for driving a load.

9. A mediator-type photocell system as claimed in claim 1, wherein the first mediator and the second mediator comprise a pair of redox mediators.

10. A mediator-type photocell system as claimed in claim 1, wherein the first and the second mediators are illuminated by an external light.

11. A photocatalyst galvanic cell system using a water as a mediator, comprising:
a galvanic cell, comprising:
a cell anode oxidizing a hydrogen to generate an electron and a hydrogen ion; and
a cell cathode receiving the electron to reduce an oxygen into the water;
a photocatalyst hydroxide device, comprising:
a light capturing anode having an oxygen generating photocatalyst for absorbing a light to generate the oxygen, wherein a first insulator is disposed between the cell cathode and the light capturing anode, and the first insulator separates the cell cathode from the light capturing anode;
a light capturing cathode having a hydrogen generating photocatalyst for absorbing the light to generate the hydrogen, wherein a second insulator is disposed between the cell anode and the light capturing cathode, and the second insulator separates the cell anode from the light capturing cathode; and
a conductive element propagating the electron at the light capturing anode to the light capturing cathode.

12. A photocatalyst galvanic cell system as claimed in claim 11, wherein the anode and the light capturing cathode coexist in a first space;
the cathode and the light capturing anode coexist in a second space; and
the first space and the second space comprise the mediator.

13. A photocatalyst galvanic cell system as claimed in claim 11, wherein the photocatalyst hydroxide device absorbs a spectral wavelength from an ultraviolet light to an infrared light.

14. A photocatalyst galvanic cell system, comprising:
a first trough comprising a first mediator, a first photo-electrode and a first galvanic electrode, wherein the first mediator absorbs a solar energy to generate a first mediator product for providing to the first galvanic electrode, wherein a first insulator is disposed between the first galvanic electrode and the first photo-electrode, and the first insulator separates the first galvanic electrode from the first photo-electrode; and
second trough comprising a second mediator, a second photo-electrode and a second galvanic electrode, wherein the second mediator absorbs the solar energy to generate a second mediator product for providing to the second galvanic electrode, wherein a second insulator is disposed between the second galvanic electrode and the second photo-electrode, and the second insulator separates the second galvanic electrode from the second photo-electrode, and the first photo-electrode is electrically connected to the second photo-electrode.

15. A photocatalyst galvanic cell system as claimed in claim 14, further comprising a cocatalyst.

16. A photocatalyst galvanic cell system as claimed in claim 15, wherein the cocatalyst serves as one of a sacrificial reagent and a catalyst carrier.

17. A photocatalyst galvanic cell system as claimed in claim 15, wherein the cocatalyst is included in the first photo-electrode and the second photo-electrode.

18. A photocatalyst galvanic cell system as claimed in claim 15, wherein the cocatalyst is included in the first galvanic electrode and the second galvanic electrode.

19. A photocatalyst galvanic cell system as claimed in claim 14, wherein when the first photo-electrode is an anode and the second photo-electrode is a cathode, the first mediator product is an oxidizer and the second mediator product is a reductant.

20. A photocatalyst galvanic cell system as claimed in claim 19, wherein the oxidizer is an oxygen, and the reductant is a hydrogen.

* * * * *